(12) United States Patent
Hong et al.

(10) Patent No.: US 9,789,808 B1
(45) Date of Patent: Oct. 17, 2017

(54) HEADLIGHT DIRECTIONAL CONTROL FOR ILLUMINATING AN IDENTIFIED OBJECT

(71) Applicant: Toyota Motor Engineering & Manufacturing North America, Inc., Erlanger, KY (US)

(72) Inventors: Michael S. Hong, Saline, MI (US); Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/200,550

(22) Filed: Jul. 1, 2016

(51) Int. Cl.
*B60Q 1/02* (2006.01)
*B60Q 1/08* (2006.01)

(52) U.S. Cl.
CPC .......... *B60Q 1/085* (2013.01); *B60Q 2300/23* (2013.01); *B60Q 2300/42* (2013.01); *B60Q 2300/45* (2013.01); *B60Q 2900/30* (2013.01)

(58) Field of Classification Search
CPC  B60Q 1/085; B60Q 2300/23; B60Q 2300/42; B60Q 2300/45; B60Q 2900/30
USPC ................... 315/82; 340/901, 436; 180/167; 356/51; 362/512
See application file for complete search history.

(56) References Cited

U.S. PATENT DOCUMENTS

| | | | |
|---|---|---|---|
| 6,281,806 B1 * | 8/2001 | Smith | B60Q 1/085 340/436 |
| 7,452,091 B2 | 11/2008 | LeBlanc et al. | |
| 7,672,760 B2 | 3/2010 | Solberg et al. | |
| 7,782,184 B2 * | 8/2010 | Wittorf | B60Q 1/50 340/435 |
| 2007/0102214 A1 * | 5/2007 | Wittorf | B60Q 1/50 180/167 |
| 2011/0204203 A1 | 8/2011 | Miller | |
| 2011/0234422 A1 * | 9/2011 | Yamashita | B60Q 5/006 340/901 |
| 2012/0275172 A1 | 11/2012 | Mizuno | |

FOREIGN PATENT DOCUMENTS

| | | |
|---|---|---|
| EP | 2380774 A1 | 10/2011 |
| JP | 2006021631 A | 1/2006 |
| JP | 2013163518 A | 8/2013 |
| JP | 2016049912 A | 4/2016 |

* cited by examiner

*Primary Examiner* — Daniel D Chang
(74) *Attorney, Agent, or Firm* — Christopher G Darrow; Darrow Mustafa PC (57) ABSTRACT

Provided is a method and device to selectively illuminate off-road objects in low-light environments using directionally-adjustable vehicle headlamps. An object may be identified by a vehicle user and/or autonomous vehicle sensors. When the identified object is within an illumination range capability of a vehicle headlamp, a frontlighting control unit operates to determine vector data for the identified object, taking into account vehicle motion. With the vector data, a headlight pattern of the vehicle headlamp may be adjusted to align with the vector data to illuminate the identified object.

15 Claims, 8 Drawing Sheets

FIG. 8
Frontlighting Control Unit 200

FIG. 9

HEADLIGHT DIRECTIONAL CONTROL FOR ILLUMINATING AN IDENTIFIED OBJECT

BACKGROUND

Vehicular collisions are considered to occur more often on poorly lit or low-light conditions on roads and motorways. It is desirable that an autonomous, driverless, highly-automated or driver-assisted vehicle have an appropriate capability to increase the illumination of objects that may pose a hazard for the vehicle and its occupants. Also, in a driver-assisted vehicle, it is desirable to provide a further capability for an operator and/or passenger to identify objects for illuminating such objects, in a night-vision or visible lighting, with vehicle headlights that may be directed based on vehicle sensors and/or based on identification of the object.

SUMMARY

A device and method for adjusting a headlight pattern of a vehicle headlamp to illuminate an identified object are disclosed.

In one implementation, a method for adjusting a headlight pattern of a vehicle headlamp is disclosed. The method includes receiving identification data for an object for illumination, and determining whether the object is within an illumination range capability of the vehicle headlamp. When the object is within the illumination range capability of the vehicle headlamp, an operation of the method determines vector data to the object and relative to a motion of the vehicle headlamp. Another operation of the method adjusts the headlight pattern of the vehicle headlamp to align with the vector data relative to the motion of the vehicle headlamp to illuminate the object.

In another implementation, a frontlighting control unit for adjusting a headlight pattern of a vehicle headlamp is disclosed. The frontlighting control unit includes a communication interface to service communication with a vehicle network, one or more processors coupled to the communication interface, the one or more processors for controlling operations of the frontlighting control unit, and a memory coupled to the one or more processors, the memory for storing data and program instructions used by the one or more processors. The one or more processors are configured to execute instructions stored in the memory to receive identification data for an object for illumination, and to determine whether the object is within an illumination range capability of the vehicle headlamp. When the object is within the illumination range capability of the vehicle headlamp, the one or more processors are configured to execute the instructions stored in the memory to determine vector data to the object and relative to a motion of the vehicle headlamp, and adjust the headlight pattern of the vehicle headlamp to align with the vector data relative to the motion of the vehicle headlamp.

In another implementation, a headlight assembly is disclosed. The headlight assembly includes an adjustment assembly for adjusting a headlight pattern of a vehicle headlamp, and a frontlighting control unit operably coupled to the adjustment assembly, the frontlighting control unit to receive and to analyze sensor data and user input data to determine an adjustment, light intensity and light frequency for the headlight pattern. The frontlighting control unit including a communication interface to service communication with a vehicle network, one or more processors coupled to the communication interface, the one or more processors for controlling operations of the frontlighting control unit, and a memory coupled to the one or more processors, the memory for storing data and program instructions used by the one or more processors. The one or more processors are configured to execute instructions stored in the memory to receive identification data for an object for illumination, and to determine whether the object is within an illumination range capability of the vehicle headlamp. When the object is within the illumination range capability of the vehicle headlamp, the one or more processors are configured to execute the instructions stored in the memory to determine vector data to the object and relative to a motion of the vehicle headlamp, and adjust the headlight pattern of the vehicle headlamp to align with the vector data relative to the motion of the vehicle headlamp.

BRIEF DESCRIPTION OF THE DRAWINGS

The description makes reference to the accompanying drawings wherein like reference numerals refer to like parts throughout the several views, and wherein.

DETAILED DESCRIPTION

An advantage of the method and device of the present disclosure is to provide selective illumination of objects with the headlight devices of the vehicle.

Provided is a method and device to selectively illuminate off-road objects in low-light environments using directionally-adjustable vehicle headlamps. An object may be identified by a vehicle user and/or autonomous vehicle sensors. When the identified object are within an illumination range capability of a vehicle headlamp, a frontlighting control unit operates to determine vector data for the identified object, taking into account vehicle motion. With the vector data, a headlight pattern of the vehicle headlamp may be adjusted to align with the vector data to illuminate the identified object.

One example of the method, a headlight pattern of a vehicle headlamp may be adjusted, in which the method includes identifying an object for illumination. As discussed in detail below, the object may be a possible hazard for the vehicle (such as wildlife crossing the road, falling rocks, blockages in the roadway, etc.), or a desire for improved visibility upon reaching a destination, such as a building address or the like. An operation of the example method determines whether the object is within an illumination range capability of a vehicle headlamp. In the example provided, the passenger-side headlamp may be further directed to provide additional illumination of the object. When the object is within the illumination range capability of the vehicle headlamp, an operation of the method determines vector data to the object and relative to a motion of the vehicle headlamp. The vector data includes information such as the direction and distance of the object. Also, the vector may be change with respect to the vehicle headlamp over time due to the general forward motion of the vehicle. With the vector data, another operation of the example method adjusts the headlight pattern of the vehicle headlamp to align with the vector data relative to the motion of the vehicle headlamp. In this manner, the object may be further illuminated by operation of the vehicle sensors and/or as selected by a vehicle operator.

Figure 1:
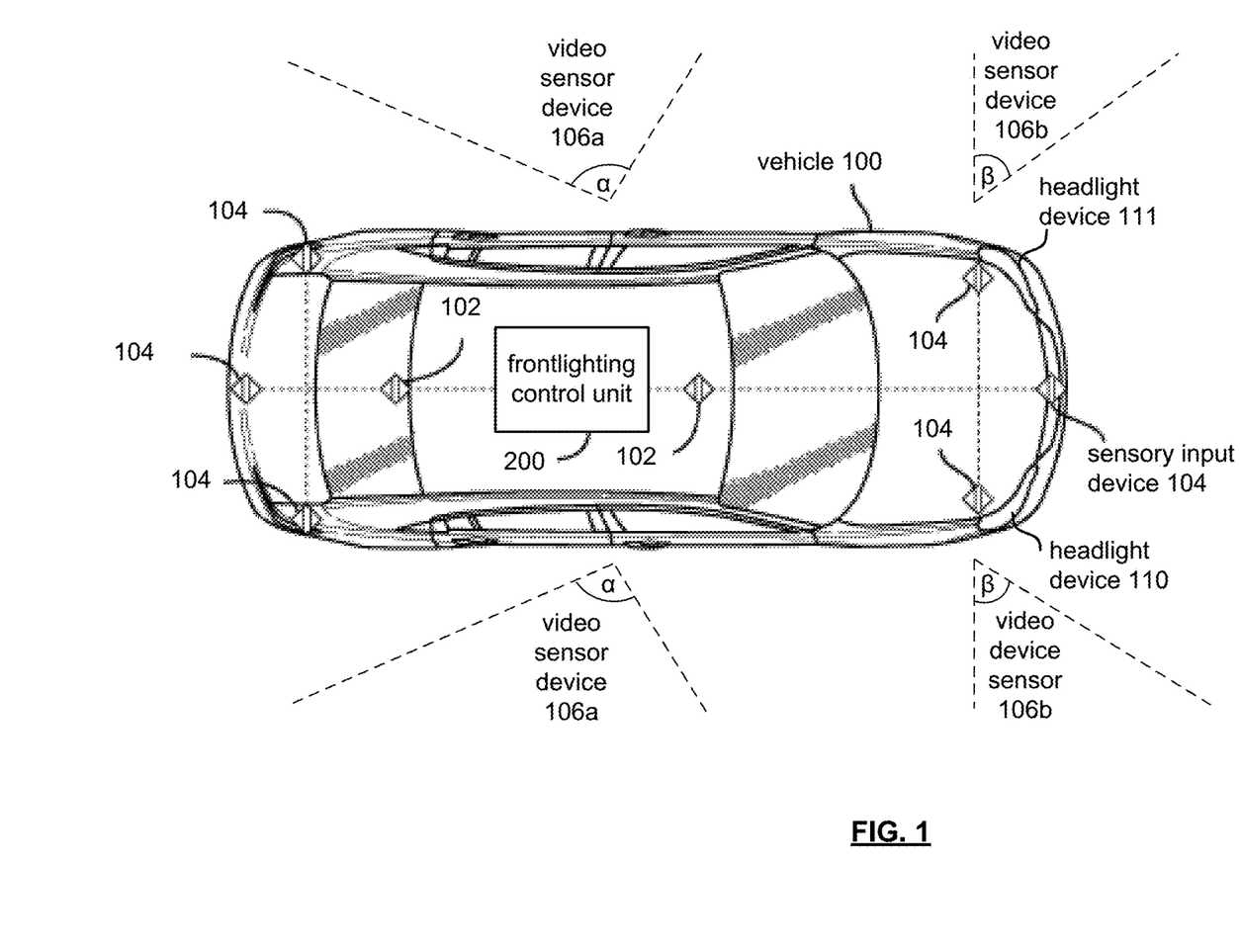
FIG. 1 is a schematic illustration of a vehicle including a frontlighting control unit.

FIG. 1 is a schematic illustration of a vehicle 100 including a frontlighting control unit 200. A plurality of sensor devices 102, 104 and 106 are in communication with frontlighting control unit 200. The plurality of sensor devices 102, 104 and 106 can be positioned on the outer surface of the vehicle 100, or may be positioned in a concealed fashion for aesthetic purposes with regard to the vehicle. Moreover, the sensors may operate at frequencies in which the vehicle body or portions thereof appear transparent to the respective sensor device. Communication between the sensors may be on a bus basis, and may also be used or operated by other systems of the vehicle 100. For example, the sensors 102, 104 and 106 may be coupled by a Body Electronic Area Network (BEAN), a Controller Area Network (CAN) bus configuration, an Audio Visual Communication-Local Area Network (AVC-LAN) configuration, and/or a combination of communication-system architectures to provide digital communications between devices and systems of the vehicle 100. Moreover, the sensors 102, 104 and/or 106 may be further coupled to the autonomous parking controller 200 via such communication-system architectures.

The sensor devices 102, 104 and 106 operate to monitor ambient conditions relating to the vehicle 100, including audio, visual, and tactile changes to the vehicle environment. The sensor devices in include audible sensor devices 102, sensory input devices 104, and video sensor devices 106a and 106b.

The audible sensor devices 102 provide audible sensing of the ambient conditions of the vehicle. With speech recognition capability, the audible sensor devices 102 may receive instructions to move, or to receive other such directions. The audible sensor devices 102 may be provided, for example, by a nano-electromechanical system (NEMS) or microelectromechanical system (MEMS) audio sensor omnidirectional digital microphone, a sound-triggered digital microphone, etc.

The sensory input devices 104 provide tactile or relational changes in the ambient conditions of the vehicle, such as an approaching person, object, vehicle, etc. The sensory input devices 104. The one or more of the sensory input devices 104 can be configured to capture changes in velocity, acceleration, and/or distance to these objects in the ambient conditions of the vehicle 100, as well as the angle of approach. The sensory input devices 104 may be provided by a Light Detection and Ranging (LIDAR) system, in which the sensory input devices 104 may capture data related to laser light returns from physical objects in the environment of the vehicle 100. The sensory input devices 104 may also include a combination of lasers (LIDAR) and milliwave radar devices. As an example, the sensory input devices 104 may identify objects in the roadway (such as other vehicle, debris, etc.), and may identify objects adjacent the roadway that may present a hazard to the vehicle 100 (such as animals and/or debris coming within the roadway).

The video sensor devices 106a and 106b operate to capture still-frame of and/or video images within associated fields of view. For the example of FIG. 1, the video sensor device 106a has a three-dimensional field-of-view of angle-α, and the video sensor device 106b has a three-dimensional field-of-view of angle-β, with each video sensor having a sensor range for video detection.

In the various driving modes, the examples of the placement of the video sensor devices 106a for blind-spot visual sensing (such as for another vehicle adjacent the vehicle 100) relative to the vehicle user, and the video sensor devices 106b are positioned for forward periphery visual sensing (such as for objects outside the forward view of a vehicle user, such as a pedestrian, cyclist, etc.).

In illumination operations by the frontlighting control unit 200, the video sensor devices 106a and 106b may display night-vision images and/or augmented reality images to an interior display such that a vehicle user may also discern objects otherwise sensed by the vehicle 100 via the sensors 102, 104 and 106. As may be appreciated, the sensors 102, 104 and 106 may have a greater sensitivity and range to detect objects as compared to the illumination range of headlight devices 110 and 111. The headlight devices 110 and 111 are relied upon by the vehicle control system, its user and/or occupants to discern objects in low-light conditions.

The headlight devices 110 and 111 may provide visible light spectrums for a vehicle user to view objects directly, or in the alternative, an augmented display may utilize non-visible or night-vision light spectrums for night-vision display on a vehicle display screen for viewing by a vehicle user. The headlight device 111 and the headlight device 110 provide passenger-side and driver-side frontlighting capability. The frame-of-reference may be swapped with respect to the driving laws for the respective country and/or territory in which the user operates the vehicle 100 (for example, driving on the right-side of the roadway, or the left-side of the roadway). For consistency, a driver-side headlight device may not deviate from the forward direction by a large magnitude, which could be disruptive to the vehicle user's concentration. With a passenger-side headlight device, a larger degree for adjusting a headlight pattern of the vehicle device may be tolerated to a larger extent to further illuminate objects beyond the roadway.

The headlight device 110 and the headlight device 111 may each include a parking light, a headlamp, a high beam light, cornering light, and a turn indicator light. Headlamp of the device 110 and 111 may operate to provide high levels of light over large areas, such as that of high-intensity discharge (HID) headlamp. Examples of HID headlamps include a mercury-vapor lamp, a metal-halide lamp, a ceramic metal-halide lamp, a sodium-vapor lamp, a xenon short-arc lamp, etc.

The headlight device 110 and 111 may also include a night-vision spectrum light to illuminate objects in low-light conditions for detection image capture by the video sensor devices 106a and 106b. Night-vision spectrum light uses the infrared (IR) spectrum (for example, near IR (NIR), short wave IR (SWIR), etc), which is invisible to human vision. An advantage for operating in a night-vision spectrum is that the vision of other vehicle operators and/or people generally, are not affected, while a display screen may show the desired object to a vehicle user as an enhanced image.

For controlling data input from the sensors 102, 104 and 106, the respective sensitivity and focus of each of the sensor devices may be adjusted to limit data acquisition based upon speed, terrain, activity around the vehicle, etc.

For example, though the field-of-view angles of the video sensor devices 106a and 106b may be in a fixed relation to the vehicle 100. The field-of-view angles may be adaptively increased and/or decreased based upon the vehicle's driving mode, such as a highway driving mode to take in less of the ambient conditions in view of the rapidly changing conditions relative to the vehicle 100, a residential driving mode to take in more of the ambient conditions that may change rapidly (such as a child's ball crossing in front of the vehicle, etc.), a parking mode in which a full field-of-view may be used to increase a sensitivity towards changes in ambient conditions relative to the vehicle 100, with the sensitivity extended further to realize changes in at least one ambient condition relative to the vehicle.

Also, some of the sensors may effectively be blocked depending upon the driving mode of the vehicle 100. For example, when the vehicle 100 is traveling at highway-level speeds, the audible sensor devices 102 simply detect excessive white noise due to the air moving across the microphone pick-up and may not be sufficiently filtered to remove the extraneous data input. In such instances, the input from the audible sensor devices 102 may be switched to an off or a sleep mode until the vehicle 100 returns to a lower speed.

The vehicle 100 can also include options for operating in manual mode, autonomous mode, and/or driver-assist mode. When the vehicle 100 is in manual mode, the driver manually controls the vehicle systems, which may include a propulsion system, a steering system, a stability control system, a navigation system, an energy system, and any other systems that can control various vehicle functions (such as the vehicle climate or entertainment functions, etc.). The vehicle 100 can also include interfaces for the driver to interact with the vehicle systems, for example, one or more interactive displays, audio systems, voice recognition systems, buttons and/or dials, haptic feedback systems, or any other means for inputting or outputting information.

In an autonomous mode, a computing device can be used to control one or more of the vehicle systems without the vehicle user's direct intervention. Some vehicles may also be equipped with a "driver-assist mode," in which operation of the vehicle 100 can be shared between the vehicle user and a computing device.

For example, the vehicle user can control certain aspects of the vehicle operation, such as steering, while the computing device can control other aspects of the vehicle operation, such as braking and acceleration. When the vehicle 100 is operating in autonomous (or driver-assist) mode, the computing device issues commands to the various vehicle systems to direct their operation, rather than such vehicle systems being controlled by the vehicle user.

In either manual, autonomous, and/or driver-assist modes of operation under low-light conditions, the sensors 102, 104 and 106 may detect obstructions that the vehicle operator (or occupant) may not otherwise be aware of until on top of it, and may not be otherwise able to take action to avoid. In the operation of the method and device described herein, the sensors 102, 104 and 106 may identify an object for illumination, as may also a vehicle user, which is discussed in detail with respect to FIGS. 2-9.

Figure 2:
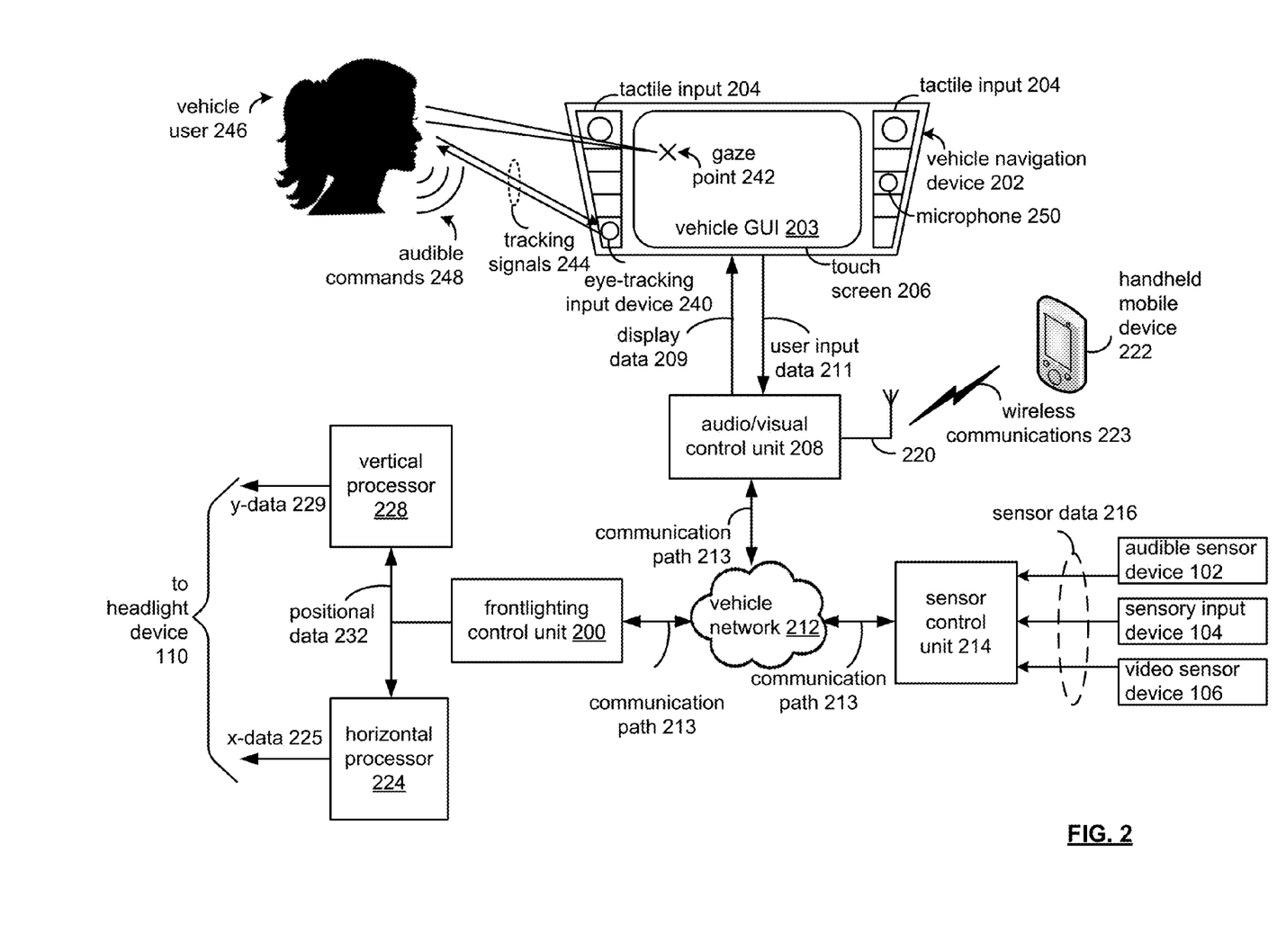
FIG. 2 is a block diagram of the frontlighting control unit of FIG. 2 is illustrated in the context of a vehicle network environment.

In FIG. 2, a block diagram of the frontlighting control unit 200 in the context of a vehicle network environment is provided. While the frontlighting control unit 200 is depicted in abstract with other vehicular components, the frontlighting control unit 200 may be combined with other system components of the vehicle 100 (see FIG. 1). Moreover, the vehicle 100 may also be an automobile or any other passenger or non-passenger vehicle such as, for example, a terrestrial, aquatic, and/or airborne vehicle.

As shown in the example of FIG. 2, the frontlighting control unit 200 communicates with a vehicle navigation device 202 through audio/visual control unit 208, and communicates with a sensor control unit 214 over a communication path 213 via vehicle network cloud 212.

As may be appreciated, the communication path 213 of the vehicle network 212 may be formed a medium suitable for transmitting a signal such as, for example, conductive wires, conductive traces, optical waveguides, or the like. Moreover, the communication path 213 can be formed from a combination of mediums capable of transmitting signals. In one embodiment, the communication path 213 can comprise a combination of conductive traces, conductive wires, connectors, and buses that cooperate to permit the transmission of electrical data signals to components such as processors, memories, sensors, input devices, output devices, and communication devices. Accordingly, the communication path 213 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle 100.

The term "signal" relates to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

The frontlighting control unit 200 operates to provide positional data 232 to horizontal processor 224 and vertical processor 228 to adjust the headlight pattern via positioning of the headlight device 110 and 111. The headlight pattern adjustment may be through electromechanical step motors relating to a dimension of travel (that is, x-axis and y-axis), by digital headlight beam-forming techniques, or a combination thereof.

The horizontal processor 224 and the vertical processor 228 can be conventional central processing units or other type of device, or multiple devices, capable of manipulating or processing information. Each of the processors may be a single processing device or a plurality of processing devices. Such a processing device may be a microprocessor, microcontroller, digital signal processor, microcomputer, central processing unit, field programmable gate array, programmable logic device, application specific standard products (ASSP), state machine, logic circuitry, analog circuitry, digital circuitry, and/or any device that manipulates signals (analog and/or digital) based on hard coding of the circuitry and/or operational instructions.

The horizontal processor 224 produces x-data 225, which includes horizontal beam data and x-coordinate data, beam intensity, and spread for the horizontal components of the beam. The vertical processor 228 produces y-data 229, which includes vertical beam data and y-coordinate data, beam intensity, and spread for the vertical components of the beam. With respect to the method and device of this disclosure, the x-coordinate data and the y-coordinate data relate to an object to be illuminated from the vehicle 100, as discussed in detail with respect to FIGS. 2-9.

Generally, the frontlighting control unit 200 operates to check and set the operation mode of the headlight devices 110 and 111, operates to switch the patterns headlight beams of the vehicle headlamps based on, for example, vehicle speed, steering wheel position, moisture sensor indications, etc.

In addition to the method and device discussed in detail with respect to FIGS. 1-9, the frontlighting control unit 200 may also operate to provide different beam types, including a spot beam (for example, a tighter focused circular beam of light), driving beam (for example, based on SAE and ECE regulations), fog beam (for example, to illuminate a pathway close to the ground but not the airborne particles in the vehicle operator's line of sight), flood beam (large wide pattern of light to flood an area with a tall vertical and wide horizontal light pattern), etc. The frontlighting control unit 200 may also operate to adjust a headlight pattern to illuminate an identified object.

The sensor control unit 214 receives sensor data 216 from the audible sensor device 102, sensory input device 104, and video sensor device 106. For further example, the sensor data 216 operates to permit object detection external to the vehicle, such as for example, other vehicles (including vehicles occupying a parking location), roadway obstacles, traffic signals, signs, trees, etc. The sensor data 216 allow the vehicle 100 (see FIG. 1) to assess its environment in order to maximize safety for vehicle passengers and objects and/or people in the environment. The sensor data 216 also provides information relating to a moving target, and to provide moving target indication (MTI) data.

As an example, the sensory input device 104 provides tactile or relational changes in the ambient conditions of the vehicle, such as an approaching person, object, vehicle, etc. The one or more of the sensory input devices 104 can be configured to capture changes in velocity, acceleration, and/or distance to objects relative to the travel of the vehicle 100, as well as an angle of approach. The sensory input devices 104 may be provided by a Light Detection and Ranging (LIDAR) system and/or milliwave radar devices. As an example, the sensory input devices 104 may identify objects in the roadway (such as other vehicle, debris, etc.), and may identify moving objects adjacent the roadway that may present a hazard to the vehicle 100 (such as animals and/or debris coming within the roadway).

Sensor data 216 relating to the video sensor devices 106*a* and 106*b* (see FIG. 1) operate to capture still-frame of and/or video images within associated fields of view for display to the touch screen 206 of the vehicle navigation device 202.

The audio/visual control unit 208 receives the sensor data 216 via the communication path 213 and vehicle network 212, and produces display data 209 for display by the touch screen 206. The audio/visual control unit 208 also receives user input data 211 from the vehicle navigation device 202, which may be from the tactile input 204, microphone 250, eye-tracking input device 240, etc.

The audio/visual control unit 208 may include an antenna 220 for wireless communications 223 with user devices, such as a handheld mobile device 222.

The handheld mobile device 222, by way of example, may be a device including hardware (for example, chipsets, processors, memory, etc.) for communicatively coupling with a network cloud and/or directly with the audio/visual control unit 208 via the antenna 220, and also includes an antenna for such wireless communication.

The antenna 220 may include one or more conductive elements that interact with electromagnetic signals transmitted by global positioning system satellites. The received signals may be transformed into a data signal indicative of the location (for example, latitude and longitude positions), and further indicative of the positioning of the device 222 with respect a vehicle position, that can be indicated on a map displayed via the touch screen 206, or otherwise displayed via the vehicle GUI 203.

The wireless communications 223 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, Zig-Bee, and/or variations thereof.

The vehicle navigation device 202 includes, for example, tactile input 204, a touch screen 206, microphone 250, and eye-tracking input device 240. The touch screen 206 operates to provide visual output or graphic user interfaces such as, for example, maps, navigation, entertainment, information, infotainment, and/or combinations thereof.

The touch screen 206 may include mediums capable of transmitting an optical and/or visual output such as, for example, a cathode ray tube, light emitting diodes, a liquid crystal display, a plasma display, etc. Moreover, the touch screen 206 may, in addition to providing visual information, detect the presence and location of a tactile input upon a surface of or adjacent to the display. Accordingly, the display may receive mechanical input directly upon the visual output provided by the touch screen 206. Additionally, it is noted that the touch screen 206 can include at least one or more processors and one or more memory modules.

The vehicle navigation device 202 may also include tactile input and/or control inputs such that the communication path 213 communicatively couples the tactile input to other control units and/or modules of the vehicle 100 (see FIG. 1). The tactile input data may provided by devices capable of transforming mechanical, optical, or electrical signals into a data signal capable of being transmitted via the communication path 213.

The tactile input 204 may include number of movable objects that each transform physical motion into a data signal that can be transmitted over the communication path 213 such as, for example, a button, a switch, a knob, etc.

The touch screen 206 and the tactile input 204 may be combined as a single module, and may operate as an audio head unit or an infotainment system of the vehicle 100. The touch screen 206 and the tactile input 204 can be separate from one another and operate as a single module by exchanging signals.

Touch screen 206 may include a display screen, such as a liquid crystal display (LCD), light emitting diode (LED), plasma display or other two dimensional or three dimensional display that displays graphics, text or video in either monochrome or color in response to display data 209.

The microphone 250 may receive audible commands 248 from vehicle user 246. In the context of the method and device disclosed herein, the vehicle user 246 may issue audible commands 248 such as "move up," "go left,"

"brighter," which correspond to the headlight pattern to illuminate an identified object.

The eye-tracking input device 240 includes a near-infrared light transmitter that projects a pattern of tracking signals 244 onto the eyes of the user 246. The eye-tracking input device 240 also includes a camera operable to take high-frame-rate images via the tracking signals 244 of the user's eyes and the reflected patterns. In this manner, the eye-tracking input device 240 operates to determine a gaze point 242 of the touch screen 206. As with a physical touch of the touch screen 206, the gaze point 242 may be used as a user input, which is provided as user input data 211 to the audio/visual control unit 208.

Figures 3, 4:
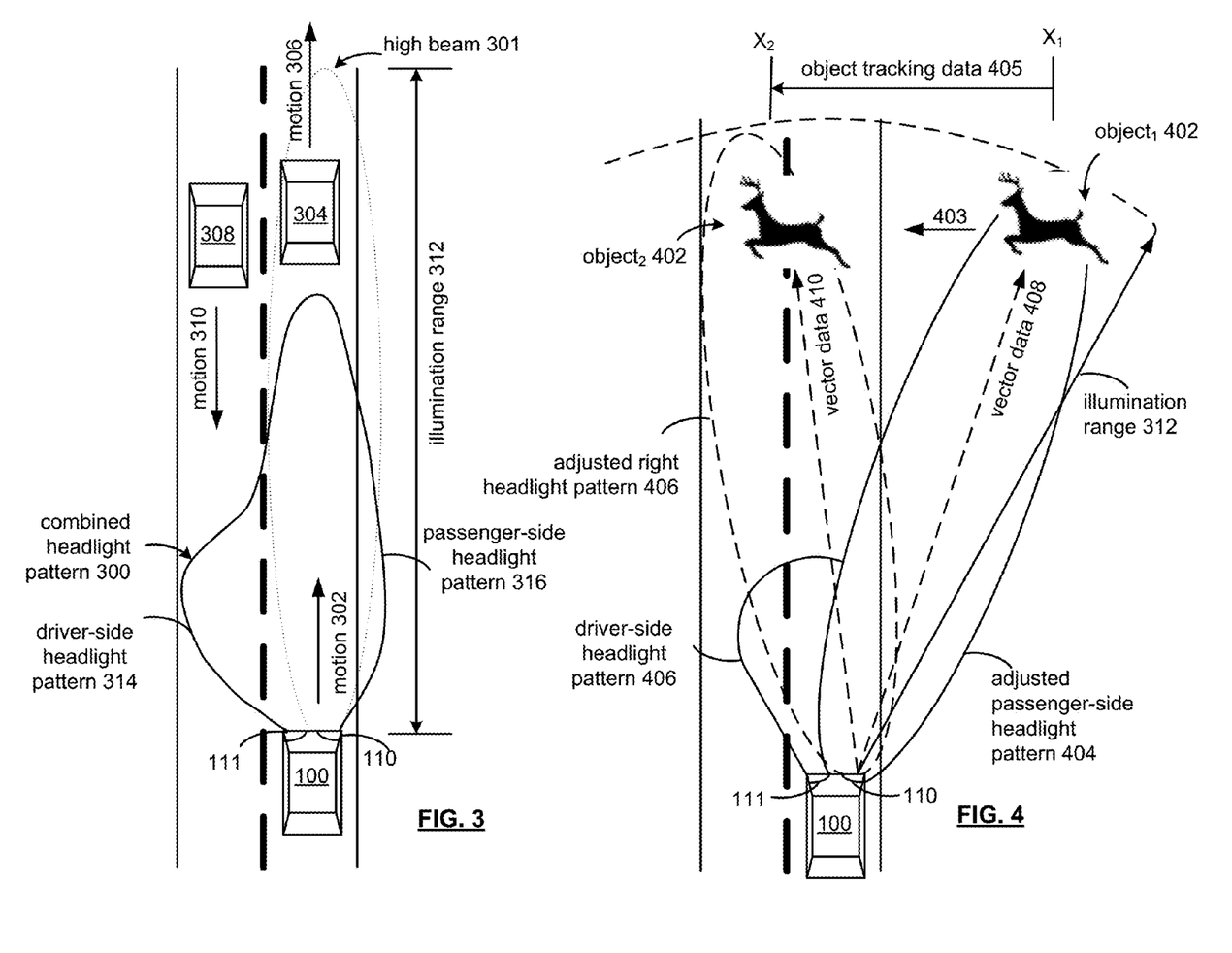
FIG. 3 illustrates the vehicle of FIG. 1 having a headlight pattern generated by vehicle.
FIG. 4 illustrates the vehicle of FIG. 1 having an adjusted headlight pattern for a moving target indication (MTI) mode of operation.

FIG. 3 illustrates a vehicle 100 having a regulation low-beam headlight pattern 300 generated by vehicle headlamps of devices 110 and 111. The headlight device 110 provides a passenger-side headlight pattern 316, and the headlight device 111 provides a driver-side headlight pattern 314, which in combination produce the combined headlight pattern 300 from vehicle 100, which has a forward motion of 302.

The headlight pattern 300 is a low beam pattern based on, for example, SAE and/or ECE regulations. The headlight pattern 300 provides a distribution of light for forward and lateral illumination, with limits on light directed towards the eyes of other road users to control glare. This headlight pattern beam is intended for use whenever other vehicles are present ahead, such as vehicle 304 with forward motion 306, whether oncoming, such as vehicle 308, having an opposite motion 310. Per the vehicle regulations relating to driving operation, the combined headlight pattern 300 defines a visible light beam with a sharp, asymmetric cutoff intended to limit significant amounts of light from being cast into the eyes of drivers of preceding (vehicle 304) or oncoming vehicles (vehicle 308).

In FIG. 3, the vehicle headlight device 110 and 111 include a high beam 301. In the example of FIG. 3, the high beam 301 of the headlight device 110 is discussed, with the understanding that the headlight device 111 may be similarly configured. The high beam 301 may a visible light beam, or a night vision light beam, either of which may be a bright, center-weighted distribution of light (visible light spectrum or night-vision spectrum) with no particular control of light directed towards vehicle 304 and 308. As such, in the visible light spectrum, the use may be more limited than in a night-vision spectrum, though ether spectrum may be used in the illumination of identified objects.

The high beam 301 also includes an illumination range 312 that indicates a maximum distance (or maximum intensity) by which an object may be illuminated from the position of the vehicle 100. Also, as an example, the configuration of the headlight devices 110 and 111 is with reference to countries and/or territories with "right-hand" traffic regulations in which traffic keeps to the right side of the roadway. As may be appreciated, the method and devices discussed herein are also applicable to countries and/or territories with "left-hand" traffic regulations in which traffic keeps to the left side of the roadway.

FIG. 4 illustrates the vehicle 100 having an adjusted headlight pattern in a vehicle headlamp for a moving target indication (MTI) mode of operation. In FIG. 4, one or more of the sensory input devices 104 (see FIGS. 1 and 2) identify an object 402 for illumination. In the present example, the object 402 is an animal on a trajectory 403. For a given sequence of pulses by one or more of the sensory input devices 104, the objects 402 will change its distance from the LIDAR system of the devices 104. Therefore, the phase of the reflection that returns from the object 402 will be different for successive pulses, such as moving from position $X_1$ to a position $X_2$ for object$_2$ 402 based on object tracking data 405.

For comparison to a moving target, a stationary target (or clutter) reflects pulses that arrive on the return to the to arrive at the one or more sensory input devices having the same phase. The object 402 remains within the illumination range 312 capability of the vehicle headlamp for the headlight device 110. The frontlighting control unit 200 determines vector data 408 relating to the identified object and the motion 302 of the vehicle 100, and adjusts the headlight pattern to produce an adjusted passenger-side headlight pattern 404 to illuminate that the object 402. Also, because the object 402 itself is in motion relative to the vehicle 100, the frontlighting control unit 200 operates to track the object, based on sensor data 216 from the one or more sensory input devices 104 (see FIGS. 1 and 2). The driver-side headlight pattern 406 continues to illuminate the roadway for the vehicle 100.

The light spectrum used, unless otherwise specified, is a night vision spectrum to capture video of the identified object in low-light conditions, and to present the capture video and/or images as a respective night-vision display to the touch screen 206 in substantially real time, or replay as a recorded video. A rationale for use of the night vision spectrum is to avoid shining visible, high intensity light into an oncoming vehicle or into a vehicle ahead of the vehicle 100. As may be appreciated, the headlight device 110 may includes a dedicated infrared lamp such that the visible combined headlight patterns continue to illuminate the roadway.

Figure 5:
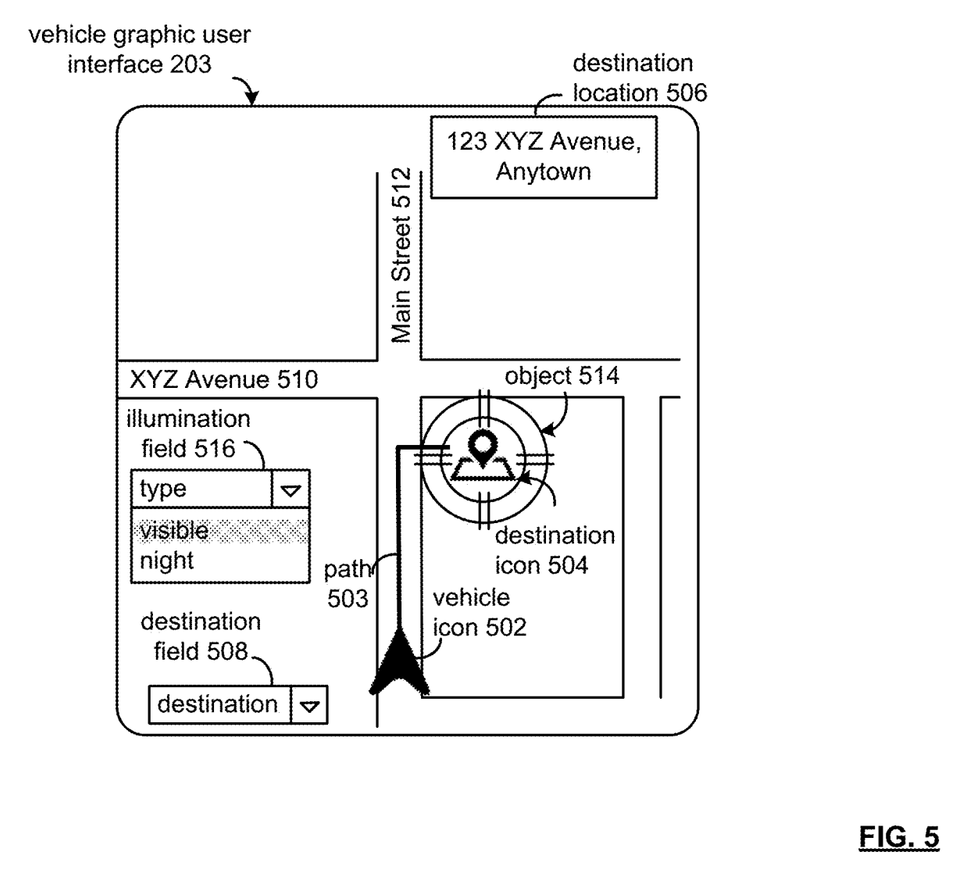
FIG. 5 illustrates a vehicle graphic user interface for a device display for identifying an object for illumination by an adjusted headlight pattern.

FIG. 5 illustrates a vehicle graphic user interface 203 for a device display by a vehicle navigation device 202 and/or a handheld mobile device 222 (see FIG. 2) for identifying an object for illumination by an adjusted headlight pattern. The vehicle graphic user interface (GUI) 203 operates to receive user input for identifying an object for illumination, either in the context of mapping destination input data for the object 514, or through user GUI object identification input data.

In the example of FIG. 5, the vehicle GUI 203 provides a map representation, which in this example is for a destination location 506 at an intersection of "Main Street 512" and "XYZ Avenue 510," as entered in destination field 508 as "123 XYZ Avenue, Anytown." A destinaion icon 504 identifies the specified location on the map, and further illustrates a vehicle icon 502 and a path 503 to reach the building at the destination icon 504.

A user may identify the location as an object 514, either through touch input, voice input, or eye gaze input. Upon identifying the object 514 for illumination to the frontlighting control unit 200 (see FIGS. 1 and 2), when the vehicle 100 approaches the object 514, the one or more sensory input devices 104 may range the identified object 514, and determine whether the object is within the illumination range capability of the vehicle headlamp of device 110. In the alternative, the vehicle navigation device 202 may determine when the vehicle 100 is within range of the object 514, based on GPS data relating to the vehicle 100, as represented by the vehicle icon 502, and the object 514.

The vehicle GUI 203 includes an illumination field 516 that operates to receive user input as to a type of light spectrum to use for the illumination. For example, the illumination may be visible spectrum for viewing by occupants and/or users of the vehicle 100, or night-vision spectrum for viewing on the touch screen 206. Illumination is useful in low or poor light conditions. Moreover, in foggy conditions, a night vision spectrum (such as near infrared (NIR), short wave IR (SWIR), etc.) provides for enhanced depictions of the object, where human sight would not be able to discern a street number for the object 514.

Figure 6:
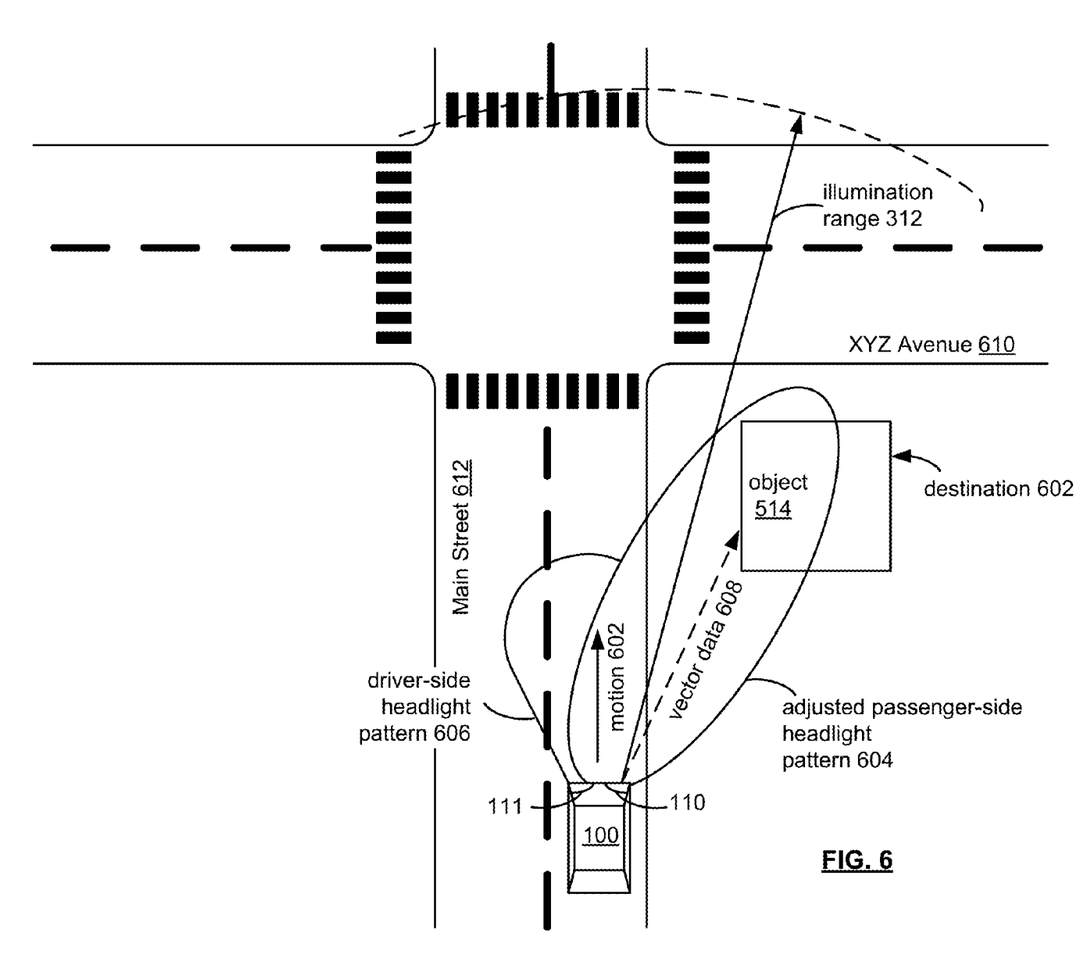
FIG. 6 illustrates adjusting a headlight pattern to illuminate an object identified through the graphic user interface of FIG. 5.

FIG. 6 illustrates adjusting a headlight pattern of a vehicle headlamp of headlight device 110 to illuminate an object 514 identified by a vehicle user through the graphic user interface of FIG. 5. Through the vehicle GUI 302 (FIG. 3), the object identified for illumination is object 514, which is destination 602. Illuminating the object 514 aids in identifying a user of the street address for the building, for example. When the vehicle 100 is within the illumination range 312 capable for the vehicle headlamp of device 110, the frontlighting control unit 200 (see FIGS. 1 and 2) determine vector data 608 to the object 514 and relative to motion 602 of the vehicle headlamp of vehicle 100. The frontlighting control unit 200 adjusts the headlight pattern of the passenger side to an adjusted passenger-side headlight pattern 604 that aligns with the vector data 608 relative to the motion 602 to illuminate the object 514. The light used for the headlight pattern 604 is a visible light spectrum, or a night vision spectrum, as selected by the vehicle user. The driver-side headlight pattern 606 remains forward facing to permit the vehicle operator, occupying the driver's seat of the vehicle 100, an uninterrupted view of the roadway ahead. When the night vision spectrum is used, a night vision image is played on the touch screen 206 of the vehicle navigation device 202 (see FIG. 2).

Figure 7:
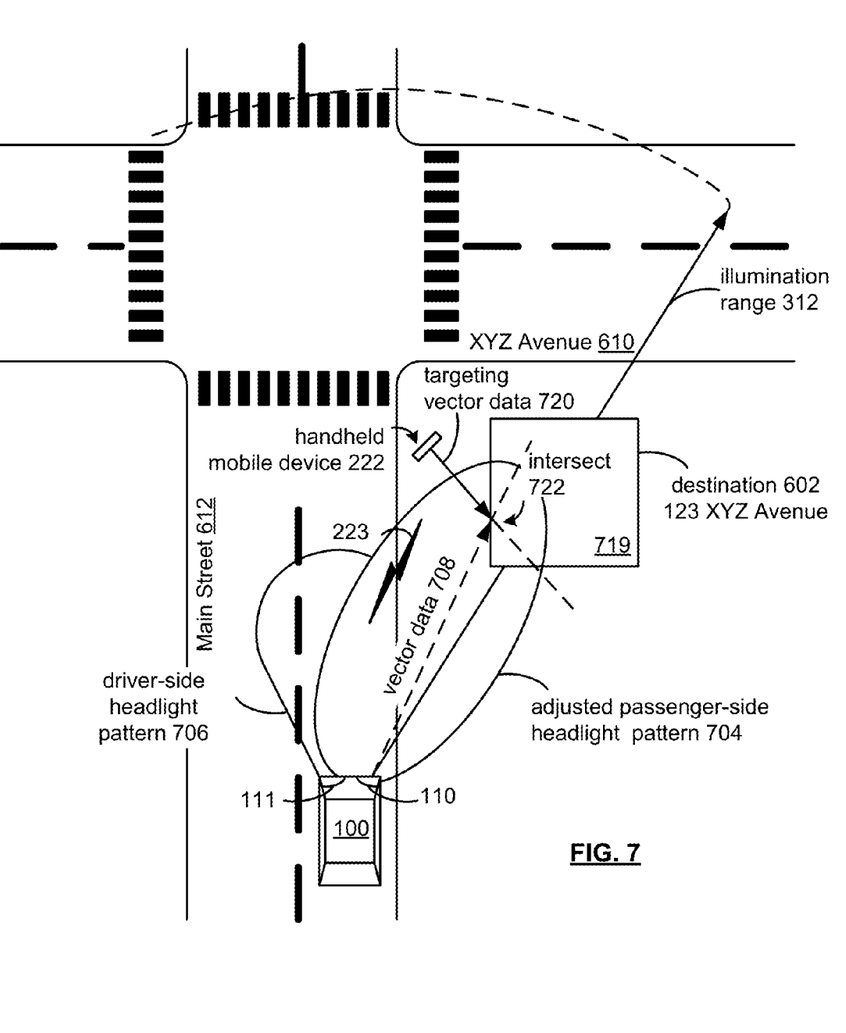
FIG. 7 illustrates a handheld mobile device used to provide targeting vector data to identify an object for illumination by the frontlighting control unit.

FIG. 7 illustrates use of a handheld mobile device 222 to provide targeting vector data 720 to identify an object 714 for illumination by the frontlighting control unit 200. Doing so permits a vehicle user to take advantage of the illuminating capabilities of the vehicle 100 while outside of the vehicle, while looking at an identified object. As also may be appreciated, a vehicle user may also use the handheld mobile device 222 in a similar fashion while inside the vehicle.

To generate targeting vector data 720, the handheld mobile device 222 (such as a cell phone, a smart phone, a personal digital assistant, tablet computer, e-readers, laptop computers, etc.), includes a combination of global positioning satellite (GPS) circuitry and gyroscope circuitry. The GPS circuitry determines where the handheld mobile device 222 is on the surface of the planet to produce position data. The gyroscope circuitry determines the orientation of a plane of the handheld mobile device 222 is pointing to produce orientation data. The handheld mobile device 222 and/or approximates distance data to the object 719 based on a camera view from the device 222.

The handheld mobile device 222, as a targeting source, operates to identify the object 719 for illumination, and provides the targeting vector data 720 to the frontlighting control unit 200 via the wireless communications 223 (see FIG. 2).

The frontlighting control unit 200 receives positional data for the handheld mobile device 222 and the vehicle 100. The control unit 200 generates the vector data 708 to intersect 722 of the targeting vector data 720 at the identified object 719, which is destination 702 at "123 XYZ Avenue."

The frontlighting control unit 200 adjusts the right headlight pattern of the headlight device 110 to produce an adjusted passenger-side headlight pattern 704, which aligns with the vector data 708 relative to the motion of the vehicle headlamp to illuminate the object 719.

When a night vision spectrum is used to illuminate the object 719, a night vision image is displayed and/or produced on the touch screen 206 of the vehicle navigation device 202. A display screen of the handheld mobile device 222 may also display the resulting night vision image, which may be received via the wireless communications 223 (see FIG. 2). In the example of FIG. 7, the vehicle 100 may be parked alongside the road ("Main Street 612"), or when the vehicle is autonomously parking, the vehicle 100 may be in motion at a limited speed sufficient to provide illumination to the passenger holding the handheld mobile device 222.

Figure 8:
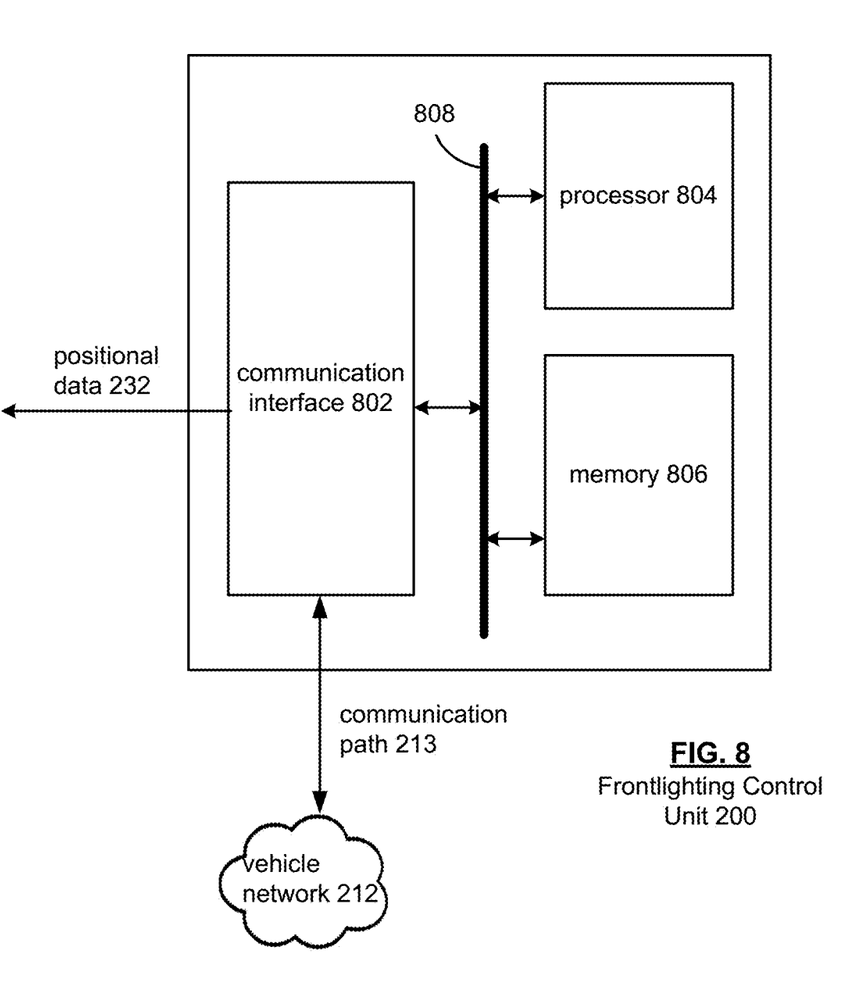
FIG. 8 is a block diagram of a frontlighting control unit of FIG. 1.

FIG. 8 is a block diagram of a frontlighting control unit 200, which includes a communication interface 802, a processor 804, and memory 806, that are communicatively coupled via a bus 808.

The processor 804 in the control unit 200 can be a conventional central processing unit or other type of device, or multiple devices, capable of manipulating or processing information. As may be appreciated, processor 804 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element 806 may be a single memory device, a plurality of memory devices, and/or embedded circuitry of the processor 804. Such a memory device may be a read-only memory, random access memory, volatile memory, non-volatile memory, static memory, dynamic memory, flash memory, cache memory, and/or any device that stores digital information. The memory 806 is capable of storing machine readable instructions such that the machine readable instructions can be accessed by the processor 804. The machine readable instructions can comprise logic or algorithm(s) written in programming languages, and generations thereof, (e.g., 1GL, 2GL, 3GL, 4GL, or 5GL) such as, for example, machine language that may be directly executed by the processor 804, or assembly language, object-oriented programming (OOP), scripting languages, microcode, etc., that may be compiled or assembled into machine readable instructions and stored on the memory 806. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 804 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor 804 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor 804 executes, hard coded and/or operational instructions corresponding to at least some of the steps and/or functions illustrated in FIGS. 1-9 to perform autonomous-based parking assistance features and methods described herein.

The communications interface 802 generally governs and manages the vehicle user input data via the vehicle network 212 over the communication path 213 and/or wireless communication 223. The communication interface 802 also manages controller unit 200 output data such as positional data 232 to the horizontal processor 224 and the vertical processor 228 (see FIG. 2). There is no restriction on the present disclosure operating on any particular hardware arrangement and therefore the basic features herein may be substituted, removed, added to, or otherwise modified for improved hardware and/or firmware arrangements as they may develop.

The sensor data 216 (see FIG. 2) includes capturing of intensity or reflectivity returns of the environment surrounding the vehicle, and relative object distance. In general, data captured by the sensors 102, 104 and/or 106 and provided to the frontlighting control unit 200 via the communication path 213 can be used by one or more of applications of the vehicle 100 to determine the environment surroundings of the vehicle.

As may be appreciated, the audio/visual control unit 208, and the sensor control unit 214 include similar architectures as described with relation to the frontlighting control unit 200 (see FIG. 2). Generally, the control units include a communication interface, a processor, and memory, that are communicatively coupled via a bus, as described in relation to control unit 200. Also, other control units may include additional circuitry to provide additional functionality. For example, audio/visual control unit 208 includes a wireless communication interface to service wireless communications 223 via antenna 200.

The wireless communication interface of the control unit 208 may operate several wireless communication technologies ranging from national and/or international cellular telephone systems to the Internet to point-to-point in-home wireless networks to radio frequency identification (RFID) systems. Each type of communication system is constructed, and hence operates, in accordance with one or more communication standards.

For instance, wireless communication systems may operate in accordance with one or more standards including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), and/or variations thereof.

Figure 9:
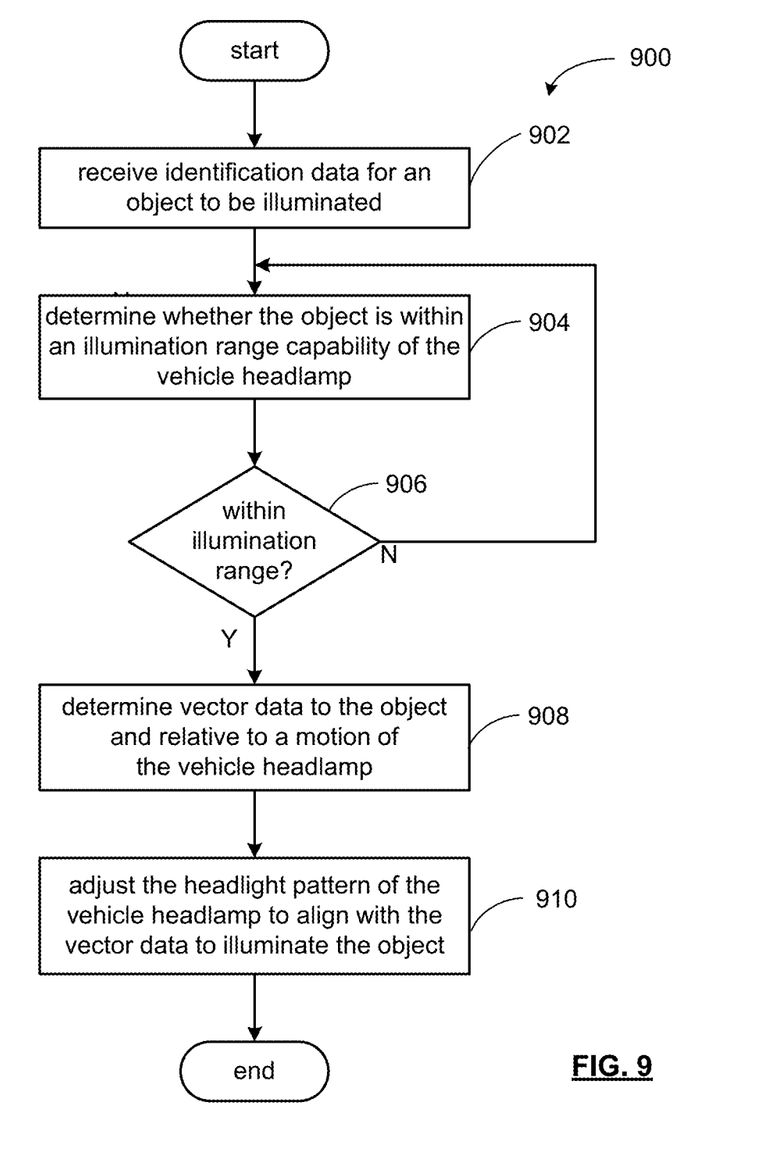
FIG. 9 is an example process in a frontlighting control unit for adjusting a headlight pattern of a vehicle headlamp.

FIG. 9 is an example process 900 in a frontlighting control unit 200 for adjusting a headlight pattern of a vehicle headlamp. At operation 902, the frontlighting control unit receives data identifying an object for illumination. The data identifying the object may include mapping destination input data (such as that provided through mapping data presented to a user through a graphic user interface (GUI)), may include data produced by selecting an object from an image captured by a digital camera of a handheld mobile device and/or a touch screen of a vehicle navigation device of a vehicle, by targeting vector data from a handheld mobile device, which may operate to identify the object by location, orientation, and distance data relative to the handheld mobile device. The GUI may also receive user input to identify an object for illumination through a touch screen device to receive touch input, by an eye-tracking device for gaze point data, and/or by a microphone input device to receive voice instructions for the identifying the object for illumination via the GUI.

The frontlighting control unit may also received an identification of any object by moving target indication (MTI) data, in which sensory input devices of the vehicle (such as LIDAR-based devices) track a hazard to a vehicle, such as an animal moving on a trajectory to intersect the roadway, a child's ball crossing the roadway, etc.

At operation 904, the method determines whether the object is within an illumination range capability of a vehicle headlamp of the vehicle headlight device. When, at operation 906, the object is within the illumination range capability, at operation 908 the frontlighting control unit determines vector data to the object and relative to a motion of the vehicle headlamp. When the identification data is received from a handheld mobile device, such as a cell phone, a smart phone, a personal digital assistant, tablet computer, e-readers, laptop computers, etc., the identifying data for the object is provided by targeting vector data from the targeting source, such as the handheld mobile device. The determining the vector data to the object further includes receiving the target vector data and basing the vector data to illuminate the object based on this data. In other words, when the object for illumination is based mapping or sensory input device data, the frontlighting control unit has information to locate the object. When based on a targeting vector, the frontlighting control unit determines an intersect by the vector data with the target vector data.

At operation 910, the frontlighting control unit adjusts the headlight pattern of the vehicle headlamp to align with the vector data relative to the motion of the vehicle headlamp to illuminate the object. Also, the headlight pattern may be a collimated headlight pattern aligned to an axis of the vector data to illuminate the object.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences. As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal, or when the magnitude of the second signal is less than that of the first signal.

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing adjusting a headlight pattern of a vehicle headlamp for illumination of an identified object.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method for adjusting a headlight pattern of a vehicle headlamp, the method comprising:
   receiving identification data for an object for illumination by the vehicle headlamp;
   determining whether the object is within an illumination range capability of the vehicle headlamp;
   when the object is within the illumination range capability of the vehicle headlamp, determining vector data to the object and relative to a motion of the vehicle headlamp by:
      receiving targeting vector data via a handheld mobile device, the targeting vector data including targeting origination data, targeting orientation data, and targeting distance data, wherein the targeting vector being in a perpendicular relation to a touch screen of the handheld mobile device; and
      generating the vector data based on the targeting vector data, wherein the vector data intersects the targeting vector data; and
   adjusting the headlight pattern of the vehicle headlamp to align with the vector data relative to the motion of the vehicle headlamp to illuminate the object.

2. The method of claim 1, wherein the identifying the object for the illumination comprising at least one of:
   mapping destination input data;
   user graphical user interface (GUI) object identification input data targeting vector data; and
   moving target indication (MTI) data.

3. The method of claim 2, wherein the user GUI object indication input data being generated by at least one of:
   a touch screen device to receive touch input for the identifying the object for illumination;
   an eye tracking device to measure a gaze point of a vehicle user for the identifying of the object for illumination; and
   a microphone input device to receive voice instructions for the identifying the object for illumination.

4. The method of claim 1, wherein the adjusting the headlight pattern of the vehicle headlamp to align with the vector data comprising at least one of:
   adjusting the headlight pattern by digital beam-forming; and
   adjusting the headlight pattern by a first electro-mechanical motor in a first dimension and by a second electro-mechanical motor in a second dimension.

5. The method of claim 1, wherein the identifying the object further comprising:
   designating a night vision mode to illuminate the object for presentation to a vehicular display.

6. The method of claim 5, wherein the collimated headlight pattern comprising at least one of:
   a spot beam pattern;
   a spread beam pattern;
   a fog beam pattern; and
   a flood beam pattern.

7. The method of claim 1, wherein the adjusting the headlight pattern further comprising:
   producing a collimated headlight pattern aligned to an axis of the vector data.

8. A frontlighting control unit for adjusting a headlight pattern of a vehicle headlamp, the frontlighting control unit comprising:
   a communication interface to service communication with a vehicle network;
   one or more processors coupled to the communication interface, the one or more processors for controlling operations of the frontlighting control unit; and
   a memory coupled to the one or more processors, the memory for storing data and program instructions used by the one or more processors, wherein the one or more processors are configured to execute instructions stored in the memory to:
   receive identification data for an object for illumination;
   determine whether the object is within an illumination range capability of the vehicle headlamp;
   when the object is within the illumination range capability of the vehicle headlamp, determine vector data to the object and relative to a motion of the vehicle headlamp by:
      receiving targeting vector data via a handheld mobile device, the targeting vector data including targeting origination data, targeting orientation data, and targeting distance data, wherein the targeting vector being in a perpendicular relation to a touch screen of the handheld mobile device; and
      generating the vector data based on the targeting vector data, wherein the vector data intersects the targeting vector data; and
   adjust the headlight pattern of the vehicle headlamp to align with the vector data relative to the motion of the vehicle headlamp.

9. The frontlighting control unit of claim 8, wherein the identifying the object for the illumination comprising at least one of:
   mapping destination input data;
   user graphical user interface (GUI) object identification input data;
   targeting vector data; and
   moving target indication (MTI) data.

10. The frontlighting control unit of claim 9, wherein the user GUI object indication input data being generated by at least one of:
    a touch screen device to receive touch input for the identifying the object for illumination;
    an eye tracking device to measure a gaze point of a vehicle user for the identifying of the object for illumination; and
    a microphone input device to receive voice instructions for the identifying the object for illumination.

11. The frontlighting control unit of claim 8, wherein the one or more processors are further configured to execute further instructions stored in the memory to adjust the headlight pattern of the vehicle headlamp to align with the vector data by at least one of:

adjusting the headlight pattern by digital beam-forming; and adjusting the headlight pattern by a first electro-mechanical motor in a first dimension and by a second electro-mechanical motor in a second dimension.

12. The frontlighting control unit of claim 8, wherein the one or more processors are further configured to execute further instructions stored in the memory to adjust the headlight pattern by:

producing a collimated headlight pattern aligned to an axis of the vector data.

13. A headlight assembly comprising:

an adjustment assembly for adjusting a headlight pattern of a vehicle headlamp;

a frontlighting control unit operably coupled to the adjustment assembly, the frontlighting control unit to receive and to analyze sensor data and user input data to determine an adjustment, light intensity and light frequency for the headlight pattern, wherein the frontlighting control unit including:

a communication interface to service communication with a vehicle network;

one or more processors coupled to the communication interface, the one or more processors for controlling operations of the frontlighting control unit; and a memory coupled to the one or more processors, the memory for storing data and program instructions used by the one or more processors, wherein the one or more processors are configured to execute instructions stored in the memory to:

receive identification data for an object to be illuminated by the vehicle headlamp;

determine whether the object is within an illumination range capability of the vehicle headlamp;

when the object is within the illumination range capability of the vehicle headlamp, determine vector data to the object and relative to a motion of the vehicle headlamp by:

receiving a targeting vector data from a targeting source, the targeting vector data including a targeting origination, a targeting orientation, and a targeting distance; and generating the vector data based on the targeting vector data, wherein the vector data intersects the targeting vector data; and adjust the headlight pattern of the vehicle headlamp to align with the vector data relative to the motion of the vehicle headlamp.

14. The headlight assembly of claim 13, wherein the identifying the object for the illumination comprising at least one of:

mapping destination input data;

user graphical user interface (GUI) object identification input data;

targeting vector data; and moving target indication (MTI) data.

15. The headlight assembly of claim 14, wherein the user GUI object indication input data being generated by at least one of:

a touch screen device to receive touch input for the identifying the object for illumination;

an eye tracking device to measure a gaze point of a vehicle user for the identifying of the object for illumination; and a microphone input device to receive voice instructions for the identifying the object for illumination.

* * * * *